(12) United States Patent
Vanleeuwen et al.

(10) Patent No.: US 12,197,466 B2
(45) Date of Patent: Jan. 14, 2025

(54) SYSTEM AND METHOD FOR HIGH PERFORMANCE ENTERPRISE LIBRARY PERFORMANCE BOOST

(71) Applicant: Shinydocs Corporation, Waterloo (CA)

(72) Inventors: Peter Vanleeuwen, Waterloo (CA); Robert Haskett, Waterloo (CA); Jason Cassidy, Waterloo (CA); Ben Barth, Waterloo (CA); Khalid Merhi, Waterloo (CA); Mervin Bowman, Waterloo (CA); Gorgi Terziev, Waterloo (CA)

(73) Assignee: SHINYDOCS CORPORATION

( * ) Notice: Subject to any disclaimer, the term of this patent is extended or adjusted under 35 U.S.C. 154(b) by 0 days.

(21) Appl. No.: 17/128,255

(22) Filed: Dec. 21, 2020

(65) Prior Publication Data

US 2021/0191956 A1   Jun. 24, 2021

Related U.S. Application Data

(60) Provisional application No. 62/950,625, filed on Dec. 19, 2019.

(51) Int. Cl.
*G06F 16/00* (2019.01)
*G06F 16/25* (2019.01)
*G06F 16/27* (2019.01)

(52) U.S. Cl.
CPC .......... *G06F 16/273* (2019.01); *G06F 16/252* (2019.01)

(58) Field of Classification Search
CPC .............................. G06F 16/273; G06F 16/252
USPC ......................................................... 707/610
See application file for complete search history.

(56) References Cited

U.S. PATENT DOCUMENTS

2013/0097687 A1* 4/2013 Storm ..................... H04L 63/10
 726/9
2017/0169403 A1* 6/2017 Zhang .................. G06Q 20/065

\* cited by examiner

*Primary Examiner* — Chelcie L Daye

(57) ABSTRACT

A content management system enables a central server to connect to remote nodes at client sites. Software modules on the remote node is responsible for making necessary calls to the central server in order to create an index of the relevant data (or metadata) and fetch the appropriate binary information and files for the related metadata. Remote nodes are populated with data from the content management system via crawl/synchronize methods, or alternatively a hard drive of the data is initially configured at headquarters whereby data is saved to prevent trafficking data over a potentially unreliable connection over an extended period of time. The hard drive is then installed at the remote site and synchronized with the software module running in high performance enterprise library (HPEL) mode. The HPEL enabled server is configured to crawl and synchronize all the data and pick up differences in data using differential crawls.

4 Claims, 4 Drawing Sheets

SYSTEM AND METHOD FOR HIGH PERFORMANCE ENTERPRISE LIBRARY PERFORMANCE BOOST

CROSS REFERENCE TO RELATED APPLICATIONS

The application claims priority to and the benefit of U.S. Provisional Patent Application Ser. No. 62/950,625, entitled "SYSTEM AND METHOD FOR HIGH PERFORMANCE ENTERPRISE LIBRARY PERFORMANCE BOOST", filed on Dec. 19, 2019, the disclosure of which is incorporated herein by reference in its entirety.

FIELD OF INVENTION

Embodiments described herein relate to the generally relate to the field of computer systems and more specifically to remote file storage and access.

BACKGROUND

Content management systems (e.g., OpenText Content Server) connect a central server with multiple users— typically through a Web interface. In certain instances, the users may be remote (i.e., oil rigs, oil platforms, wind farms, solar farms, etc.) and the connection to be made with the server (i.e., at headquarters) may be expensive (i.e., satellite links), inconsistent (weather dependent), slow or may require high latency links.

Existing solutions over links which are slow, have high-latency, or may repeatedly disconnect for long periods of time render such a solution ineffective in delivering documents when they are needed. An effective mechanism to provide data to remote node sites is desirable.

SUMMARY

A content management system enables a central server to connect to remote nodes at client sites. Software modules, such as the Shinydrive Server, on the remote node is responsible for making necessary calls to the central server in order to create an index of the relevant data (or metadata) and fetch the appropriate binary information and files for the related metadata. Remote nodes are populated with data from the content management system via crawl/synchronize methods, or alternatively a hard drive of the data is initially configured at headquarters whereby data is saved to prevent trafficking data over a potentially unreliable connection over an extended period of time. The hard drive is then installed at the remote site and synchronized with the Shinydrive Server running in high performance enterprise library (HPEL) mode. The HPEL enabled server is configured to crawl and synchronize all the data and pick up differences in data using differential crawls.

DETAILED DESCRIPTION

This disclosure concerns exposing a remote content management system to a local nodes server as a shared drive. Rather than simply mimicking the look and feel of a local/shared drive, the operating system (OS) and user are presented with a local/shared drive that is controlled by an interface at or below the level of the file system driver. The remote content management system thus appears substantially identical to a local/shared drive, which places little to no learning curve on users. The system intelligently handles temporary files and file permissions. The system also allows for smooth migration from legacy storage to content management system. Other features and advantages of the system will be apparent from the following description.

Further embodiments of the content management system are described in US patent application US20160050257, entitled "Interfacing with remote content management systems" which is herein incorporated by reference.

Figure 1:
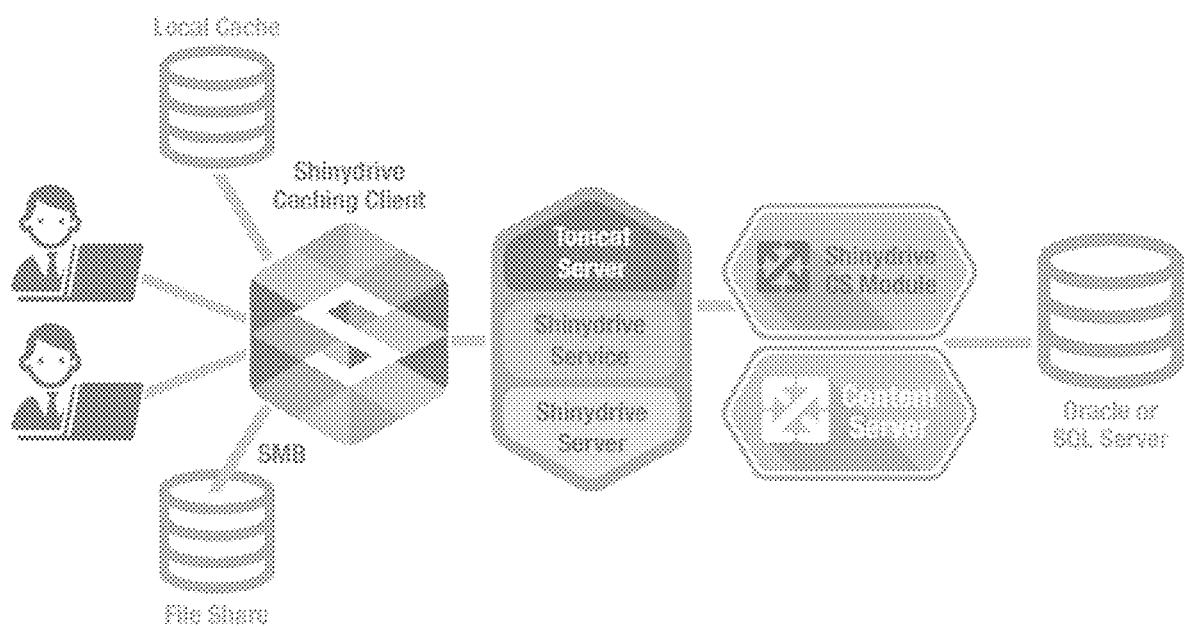
FIG. 1 is a schematic diagram illustrating a content management system.

FIG. 1 is a schematic diagram illustrating a content management system. Content management system as described in FIG. 1 consists of a Content Server. An example of Content Server includes the Open Text Content Server. Content Server connects to a database which may be an Oracle database, Microsoft SQL Server, or any other database system.

A Content Server Module (CS Module) is installed within Content Server to enable communication and synchronization of data. The CS Module connects to a connectivity module which includes a Tomcat web server, a Shinydrive Service and a Shinydrive Server. A web services interface is made available and deployed to Tomcat in order to interface with the module installed on the target Content Server.

The connectivity module connects to client modules through a Shinydrive Caching Client. The Shinydrive Caching client also enables multiple users to connect via their computer or laptop.

Figure 2:
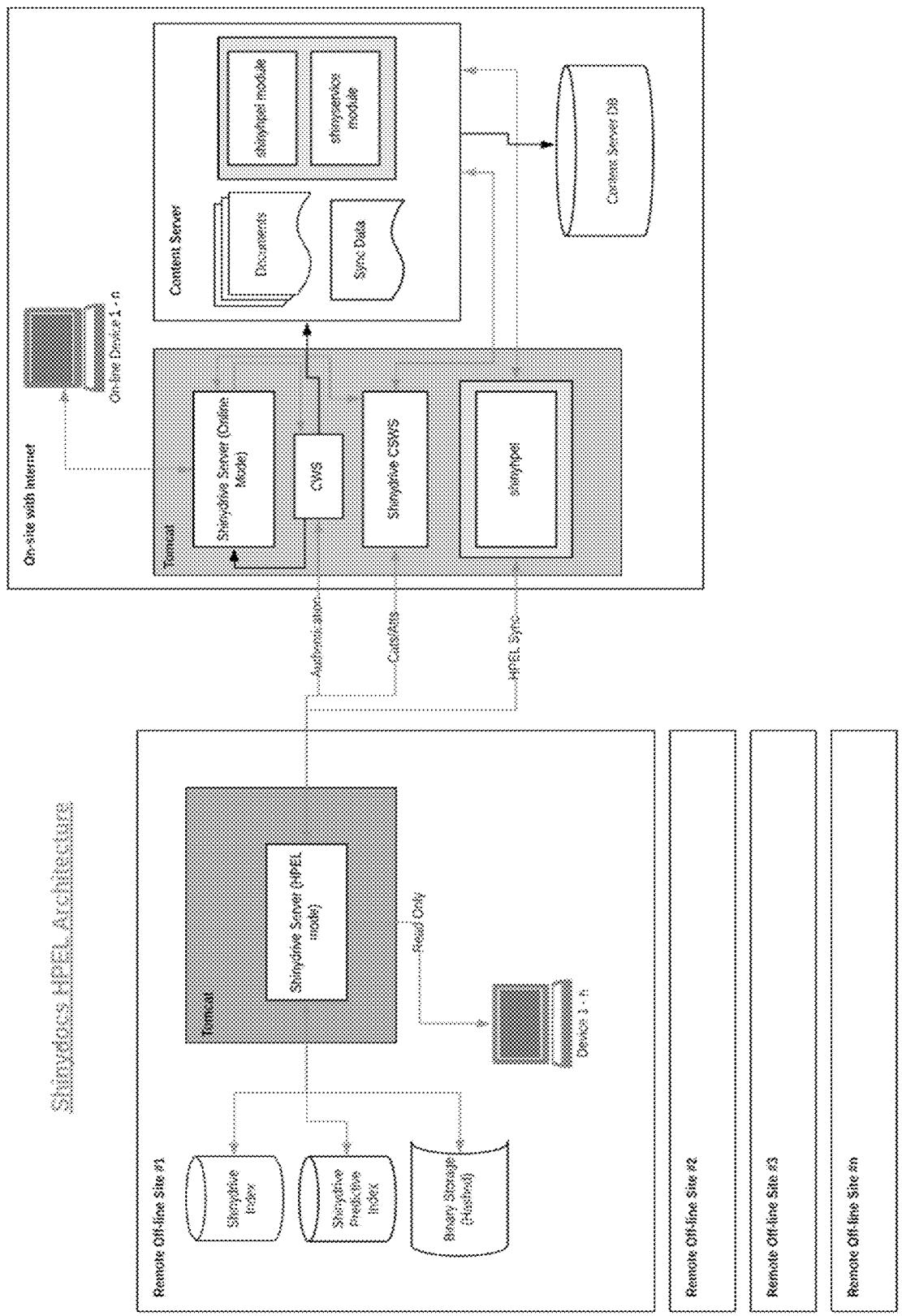
FIG. 2 is a schematic diagram illustrating a HPEL architecture system.

FIG. 2 is a schematic diagram illustrating a High Performance Enterprise Library (HPEL) architecture system. According to FIG. 2 the HPEL architecture system consists of a main server (i.e., on-site with Internet) which should also be located at headquarters or other online data centers. The one or more client node modules (i.e. remote off-line site #1, remote off-line site #2, remote off-line site #3, remote off-line site #n) periodically polls the main server module at headquarters.

Main server module consists of a Tomcat module such as those developed by the Apache Tomcat Project (or an execution environment similar or analogous to Tomcat), a Content Server module, a Content Server database and one or more computer devices that are online (i.e., connected to the internet). Within the Tomcat module, there exists a Shinydrive server that is online, a Content Web Server (CWS), a Shinydrive Middleware (CSWS) and a software module shinyhpel. The Content Server also includes a shinyhpel module, a shinyservice module, a documents module and a sync data module.

The Content Web Server (CWS) is a web service that provides a Simple Object Access Protocol (SOAP) interface to interact with Content Server. The Shinydrive Content Web Server provides a SOAP interface to facilitate interactions with the Shinydrive components installed on Content Server. The synchronization module shinyhpel is a dedicated module created for optimizing the calls made to fetch the metadata. It generates and compresses all the metadata in one artifact and makes it available as a regular file in Content Server. Thus, using CWS, the service can make regular calls to get the entire tree of metadata for the relevant folder.

On the client node module such as Remote Off-line site #1, there exists a Tomcat web server module that hosts a Shinydrive Server running in HPEL mode. The Tomcat module connects to a Shinydrive index module, Shinydrive Predictive Index databases, and a Binary Storage module where data is hashed. Further, the Tomcat module also has a READ ONLY connection to one or more devices. By selecting a READ ONLY interface or a READ/WRITE interface, the server data update mechanism can be selected to be updated from either the server site, or the server site plus the remote site.

The client node module communicates with the main server module through the respective Tomcat modules on the client node module and the main server module. Communication may include authentication requests for example through Secure Sockets Layer (SSL) requests. In addition, communication may include Categories and Attributes (Cats/Alts) requests and HPEL Sync requests. The Categories and Attributes requests are fields that describe the data, as stored in Content Server, which helps the user find the information in HPEL using the advanced search feature.

Figure 3:
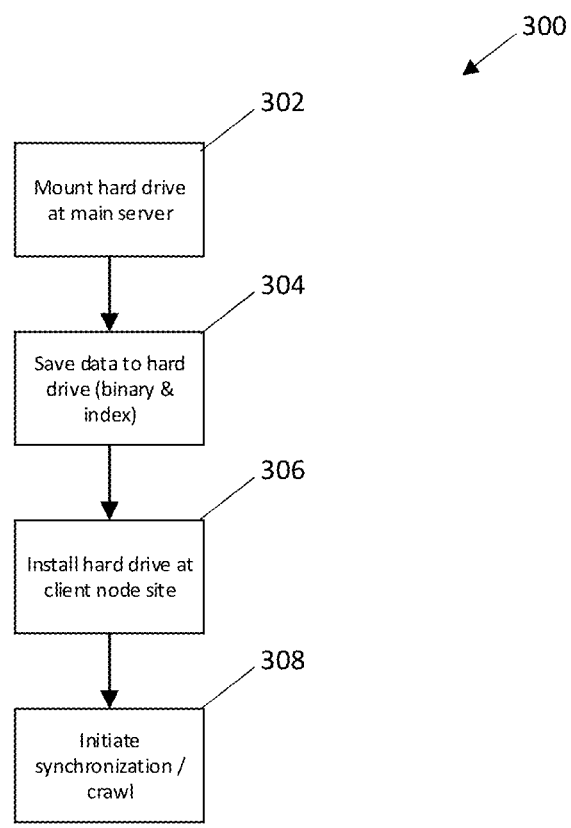
FIG. 3 is a workflow diagram illustrating steps for initial installation of client node server.

FIG. 3 is a workflow diagram illustrating steps for initial installation of client node server. According to the workflow 300 of FIG. 3, data on a client node server is initially primed at the main server at headquarters. The first step is to mount a computer hard drive at the main server (at headquarter), at step 302. Data is then saved to the hard drive, at step 304. The data includes both the binary files and index of all the data from the content server or database. In one embodiment, a physical hard drive is shipped and installed at the client node server at a remote site (for example, on an oil rig), at step 306. In other embodiments, any communication mechanism may be used, with preference given for those channels suitable for reliable volume transfer of data. For example, if a fast and reliable internet connection can be established, the client and server will synchronize initially. Upon the initial installation, the system will initiate an initial synchronization and crawl of the data, at step 308.

The HPEL architecture system, as described in FIG. 2 is configured to pick up updates, and changes from the main server (i.e., Content Server). Future synchronization and crawls will be able to pick up differential or differences in the crawl. The HPEL module is configured to crawl periodically and synchronize all the data and pick up difference in data using differential crawls or run a full crawl if required. Furthermore, synchronization is READ ONLY from the Content Server to the client node site to ensure that the main data is not changed or contaminated. There is a further mechanism to enable WRITE of data at remote client node site.

Figure 4:
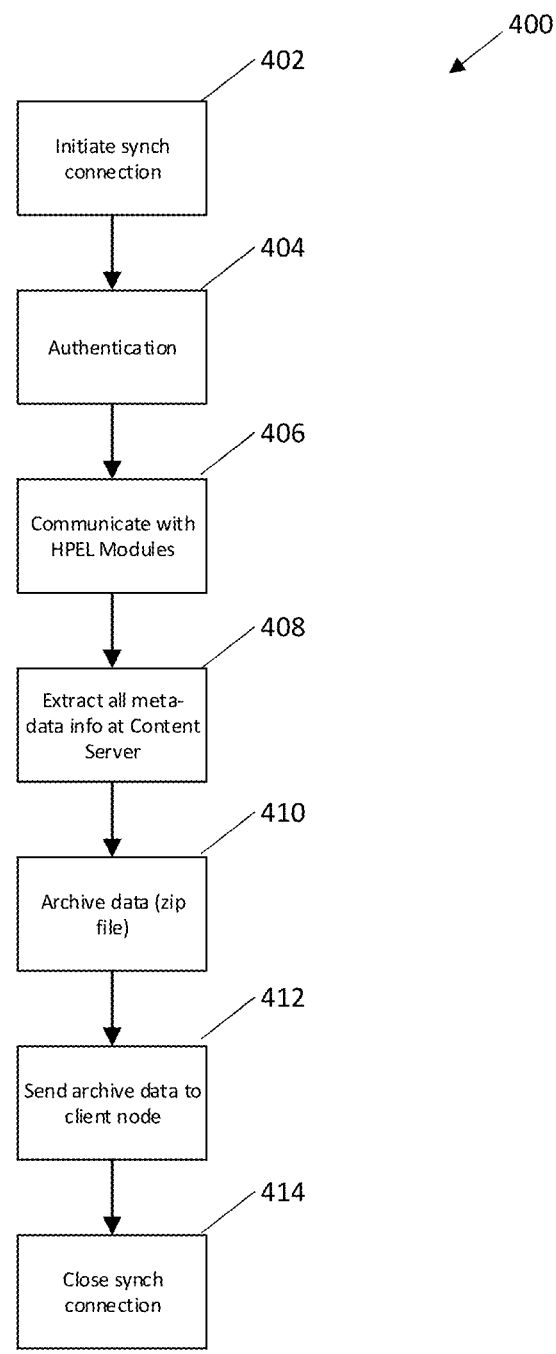
FIG. 4 is a workflow diagram illustrating steps for synchronization of the main server with the client node.

FIG. 4 is a workflow diagram illustrating steps for synchronization of the main server with the client node. According to the workflow 400 of FIG. 4, the synchronization method starts with initiating a synchronization connection between the main server and a client node site, at step 402. The next step is authentication to ensure that security/authentication is completed before proceeding, at step 404. Upon a successful authentication, the main server module and the client node site will communicate to each other using the respective HPEL modules stored on each respective server, at step 406.

At the main server, all relevant meta-data is extracted from Content Server, at step 408. This meta-data is then achieved as a zip file and stored in place on the content management system (CMS), at step 410. The archive data (zip file) is then fetched by the remote nodes, at step 412. Alternatively at step 412, the archive data is sent from the content server at the main server to one or more remote client nodes. Upon successful receipt of the archive data, the synch connection would then be closed, at step 414. Providing a separate synchronization process for the meta-data from the process of synchronizing, the full data store provides better and more timely information regarding the update status of the remote file system at remote sites.

According to an embodiment of this disclosure, a computer-implemented method of synchronizing data between a central server and a remote client node of a content management system, using a high performance enterprise library (HPEL) module is disclosed. This method comprises initiating a synchronization connection from a remote client node, authenticating the connection to the content management system, establishing a communications connection between the HPEL module of the content management system and the synchronization module, extracting meta-data at the content management system, archiving the extracted meta-data, sending the archive data to the remote client node, and closing the synchronization connection.

According to further embodiments of this disclosure, a computer-implemented method of initial installation of a remote client node of a content management system, using a high performance enterprise library (HPEL) module, further comprises the steps of mounting a hard drive at the central server of the content management system, saving data to the hard drive, installing the hard drive at the client node site, and initiating a synchronization connection.

According to further embodiments of this disclosure, a system of synchronizing between a central server and a remote client node server of a content management system, using a high performance enterprise library (HPEL) module is disclosed. This system comprises of a a central server, the central server further comprising a server computer processor, a content server, a content server database, and a web server. The system further comprises one or more remote client nodes servers, the central server further comprising, a client computer processor, a software index or predictive index, a binary storage device, a client web server and one or more HPEL module interfaces to enable synchronization of data between the central server and the remote client node server While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters and configurations described herein are meant to be exemplary inventive features and that other equivalents to the specific inventive implementations described herein may be realized. It is, therefore, to be understood that the foregoing implementations are presented by way of example and that, within the scope of the appended claims and equivalents thereto, inventive implementations may be practiced otherwise than as specifically described and claimed. Inventive implementations of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

What is claimed:

1. A system of synchronizing between a central server and a remote client node servers and a main server or central server of a contant management system, the system comprising:
   the main server further comprising:
      a main server computer processor;
      a content server;
      a content server database;
      a web server;
      a Shinydrive Server running in HPEL mode on the web server configured to connect to the one or more remote client node servers;
   the one or more remote client nodes servers further comprising:
      a client computer processor;
      an index of meta-data;
      a predictive index;
      a binary of information or binary files;
      a binary storage device;
      a client web server;
      a Shinydrive Server running in HPEL mode on the client web server configured to connect to the central server;
   one or more high performance enterprise library (HPEL) modules to enable synchronization of data between the central server and the remote client node server;
   whereby the binary storage device is a computer hard drive for saving data from the central server configured for off-line delivery to the remote node server and installation and synching with the central server;
   whereby the system is configured for offline saving of data onto the computer hard drive by saving binary files or index of binary files;
   whereby the system is configured for initiating a synchronization connection by crawling data on both the central server and one or more remote client nodes servers and comparing the synchronization data;
   whereby crawling the data further comprises detecting differences in data in the crawls;
   wherein the one or more HPEL modules is configured to execute instructions on the central server;
   wherein if differences are detected, initiate an update of information to cause data on the one or more remote client node servers to be the same as the data on the central server;
   wherein the one or more HPEL modules are configured to optimizing one or more calls made to fetch the metadata by generating and compressing all the metadata in one artifact and making the metadata available as a regular file in the content server;
   wherein the client node server communicates with the central server through the web server whereby communication includes Categories and Attributes requests and HPEL synchronization requests;
   wherein the Categories and Attributes requests are fields that describe the data, as stored in Content Server which helps the user find the information in the one or more HPEL modules.

2. The system of claim 1 whereby the web server further comprises a client/server node of a Tomcat web server.

3. The system of claim 1 wherein the synchronization of data between the central server and the one or more remote client node servers includes authenticating an SSL connection.

4. The system of claim 1 wherein if differences are detected, cause the most recently updated information to be written to both the one or more remote client node servers and the central server.

* * * * *